(12) United States Patent
Tan et al.

(10) Patent No.: US 11,671,666 B2
(45) Date of Patent: Jun. 6, 2023

(54) VIDEO PLAYING CONTROL METHOD, DEVICE AND STORAGE MEDIUM BASED ON A VIDEO SOURCE SELECTION

(71) Applicant: SHANGHAI BILIBILI TECHNOLOGY CO., LTD., Shanghai (CN)

(72) Inventors: Zhaoxin Tan, Shanghai (CN); Hao Liu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 23 days.

(21) Appl. No.: 17/424,014

(22) PCT Filed: Dec. 16, 2019

(86) PCT No.: PCT/CN2019/125524
§ 371 (c)(1),
(2) Date: Jul. 19, 2021

(87) PCT Pub. No.: WO2020/151400
PCT Pub. Date: Jul. 30, 2020

(65) Prior Publication Data
US 2022/0086528 A1    Mar. 17, 2022

(30) Foreign Application Priority Data
Jan. 23, 2019   (CN) .......................... 201910061504.7

(51) Int. Cl.
*H04N 21/462*  (2011.01)
*H04N 21/466*  (2011.01)
*H04N 21/472*  (2011.01)
*H04N 21/4782* (2011.01)

(52) U.S. Cl.
CPC ....... *H04N 21/4622* (2013.01); *H04N 21/466* (2013.01); *H04N 21/4782* (2013.01); *H04N 21/47217* (2013.01)

(58) Field of Classification Search
CPC ............. H04N 21/4622; H04N 21/466; H04N 21/47217; H04N 21/4782; H04N 21/2387;
(Continued)

(56) References Cited

U.S. PATENT DOCUMENTS

2008/0228865 A1    9/2008  Cruzada
2017/0149861 A1*   5/2017  Good ................. H04N 21/2362
(Continued)

FOREIGN PATENT DOCUMENTS

CN    101567206 A    10/2009
CN    102761603 A    10/2012
(Continued)

OTHER PUBLICATIONS

International Patent Application No. PCT/CN2019/125524; Int'l Search Report; dated Mar. 13, 2020; 3 pages.

*Primary Examiner* — John R Schnurr
(74) *Attorney, Agent, or Firm* — BakerHostetler

(57) ABSTRACT

The present invention provides a method, device and storage medium of controlling video playing based on a video source selection and belongs to a field of the Internet technology. The method, device and storage medium of controlling video playing based on a video source selection of the present invention may determine a video source format adopted based on the browser, then filter the video source based on actual application effect of a player, adopt the optimal video source, and automatically select other video sources to continue playback in case of playback errors. The method, device and computer-readable storage
(Continued)

medium of controlling video playing based on a video source selection of the present invention have the advantages of simple implementation mode, low application cost and wide application range.

15 Claims, 4 Drawing Sheets

(58) Field of Classification Search
CPC ........... H04N 21/4425; H04N 21/6587; H04N 21/85406; H04N 21/24; H04N 21/25891
See application file for complete search history.

(56) References Cited

U.S. PATENT DOCUMENTS

| | | |
|---|---|---|
| 2017/0171584 A1 | 6/2017 | Raftelis et al. |
| 2017/0214948 A1* | 7/2017 | Liang ............... H04N 21/23116 |
| 2019/0028746 A1* | 1/2019 | Inzerillo ............... H04L 65/613 |

FOREIGN PATENT DOCUMENTS

| | | |
|---|---|---|
| CN | 103095791 A | 5/2013 |
| CN | 103327392 A | 9/2013 |
| CN | 103873938 A | 6/2014 |
| CN | 104079990 A | 10/2014 |
| CN | 104104971 A | 10/2014 |
| CN | 104144351 A | 11/2014 |
| CN | 106658028 A | 5/2017 |

* cited by examiner

… (1)

VIDEO PLAYING CONTROL METHOD, DEVICE AND STORAGE MEDIUM BASED ON A VIDEO SOURCE SELECTION

CROSS-REFERENCE TO RELATED APPLICATION

The present invention is a national phase application of PCT international patent application No. PCT/CN2019/125524, filed on Dec. 16, 2019, which claims priority to Chinese patent application No. 201910061504.7, filed on Jan. 23, 2019. The entire disclosure of the above-identified application is hereby incorporated by reference herein and made a part of this specification.

TECHNICAL FIELD

The embodiments of the present application relate to a field of the Internet technology, more particularly to relate to a field of network video technology, and specifically to refer to a video playing control method, a device and a storage medium based on a video source selection.

BACKGROUND

Video website is a popular content website at present. Web browser is one of the main ways to visit video websites. At present, there are three kinds of video source formats commonly used in the network: DASH (Dynamic Adaptive Streaming over HTTP) format, fly (Flash Video) format and mp4 (MPEG-4) format. Play in the DASH format and the fly format is based on MSE (Media Source Extensions) of HTML5, and play in the MP4 format is natively supported by a browser.

A video content in a video website is usually compressed into the three kinds of video source formats mentioned above. The best user experience is the DASH format, followed by the fly format and the mp4 format. Because of level of support of different browser platforms for the video source formats, usability of some browsers is just the opposite, for example, the mp4 format is better than the fly format, and the DASH format is the most unsupported. Generally, a selection of a video source is an automatic process set by the browser, so there is no possibility of optimization. This causes some browsers to set the DASH format as the default video source, but actual effect is not as good as the fly format.

Therefore, how to filter the video source according to actual application effect of a player, so as to adopt the optimal video source, and automatically select other video sources to continue playing in case of playing errors, has become an urgent problem in the field.

SUMMARY

The purpose of the present invention is to overcome above disadvantages of the prior art, and provide a video playing control method, device and storage medium based on a video source selection, which can filter the video source according to actual application effect of a player, adopt the optimal video source, and automatically select other video sources to continue playing in case of playing errors.

In order to realize the above purpose, the video playing control method based on a video source selection in this present invention includes the following steps:

(1) a browser initializing a player and determining a video to be played;

(2) determining a video source of the video according to the browser;

(3) the player obtaining the video source and playing the video.

In the video playing control method based on a video source selection, the video source includes a DASH format, an fly format and an mp4 format.

In the video playing control method based on a video source selection, the step (2) specifically includes the following steps:

determining a video source from the DASH format, the fly format and mp4 format according to a support degree of the browser for each video source format.

In the video playing control method based on a video source selection, the browser includes a local learning library, the local learning inventory stores the support degree of the browser for each video source format, the step (2) specifically includes the following steps: determining the video source from the DASH format, the fly format and the mp4 format, according to the support degree of the video source format stored in the local learning library.

In the video playing control method based on a video source selection, in a case of the same support degree of each video source format, a previous video source is preferred in the order of the DASH format, the fly format and the mp4 format.

In the video playing control method based on a video source selection, the method further includes the following steps:

(4) when an error occurs in the player, preferring a previous video source in the order of the DASH format, the fly format and the mp4 format.

The present invention further provides a video playing control method based on a video source selection, the method includes the following steps:

(A) a browser initializing a player and determining a video to be played;

(B) the server determining a video source of the video according to the browser;

(C) the player obtaining the video source from the server and playing the video.

In the video playing control method based on a video source selection, the video source includes a DASH format, an fly format and an mp4 format.

In the video playing control method based on a video source selection, the step (B) specifically includes the following steps:

the server determining a video source from the DASH format, the fly format and mp4 format according to a support degree of the browser for each video source format.

In the video playing control method based on a video source selection, the server includes an online learning library, the online learning library stores the support degree of the browser for each video source format, the step (B) specifically includes the following steps: determining the video source from the DASH format, the fly format and the mp4 format, according to the support degree of the video source format stored in the online learning library.

In the video playing control method based on a video source selection, the server obtains the support degree of each browser for each video source format to establish and update the online learning library, by analyzing the logs of each video source video played on each browser.

The video playing control method based on a video source selection further includes the following steps:

(D) when an error occurs in the player, preferring a previous video source in the order of the DASH format, the fly format and the mp4 format.

This present invention further provides a computer-readable storage medium, storing computer programs executed by a processor, when the computer programs are executed by a processor, the video playing control method based on a video source selection is realized.

This present invention further provides a video playing control device based on a video source selection, which includes a processor and a memory, wherein the memory stores computer programs, when the computer programs are executed by the processor, the video playing control method based on a video source selection is realized.

The video playing control method, device and computer-readable storage medium based on a video source selection are adopted, which can determine a video source format adopted according to the browser, and then filter the video source according to actual application effect of a player, adopt the optimal video source, and automatically select other video sources to continue playing in case of playing errors. And, the video playing control method, device and computer-readable storage medium based on a video source selection of the present invention have the advantages of simple implementation mode, low application cost and wide application range.

DETAILED DESCRIPTION OF ILLUSTRATIVE EMBODIMENTS

In order to be able to understand technical content of the present invention more clearly, the following embodiments are particularly described.

Figure 1:
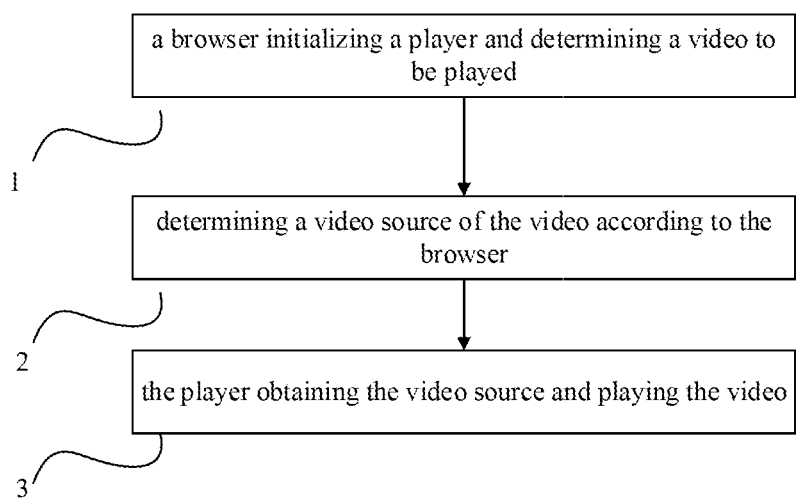
FIG. 1 illustrates a flowchart of steps of an embodiment of a video playing control method based on a video source selection of the present invention.

Please refer to FIG. 1, it is a flowchart of steps of an embodiment of a video playing control method based on a video source selection of the present invention.

In one embodiment, the video playing control method based on a video source selection includes the following steps:

(1) a browser initializing a player and determining a video to be played;

(2) determining a video source of the video according to the browser, the video source includes a DASH format, an fly format and an mp4 format:

(3) the player obtaining the video source and playing the video.

In one preferred embodiment, the step (2) specifically includes the following steps:

determining a video source from the DASH format, the fly format and mp4 format according to a support degree of the browser for each video source format. Specifically to say, the step specifically includes: the browser includes a local learning library, the local learning inventory stores the support degree of the browser for each video source format, the step (2) specifically includes the following steps: determining the video source from the DASH format, the fly format and the mp4 format, according to the support degree of the video source format stored in the local learning library.

In a further preferred embodiment, in a case of the same support degree of each video source format, a previous video source is preferred in the order of the DASH format, the fly format and the mp4 format.

In a more preferred embodiment, the method further includes the following steps:

(4) when an error occurs in the player, preferring a previous video source in the order of the DASH format, the fly format and the mp4 format.

Figure 2:
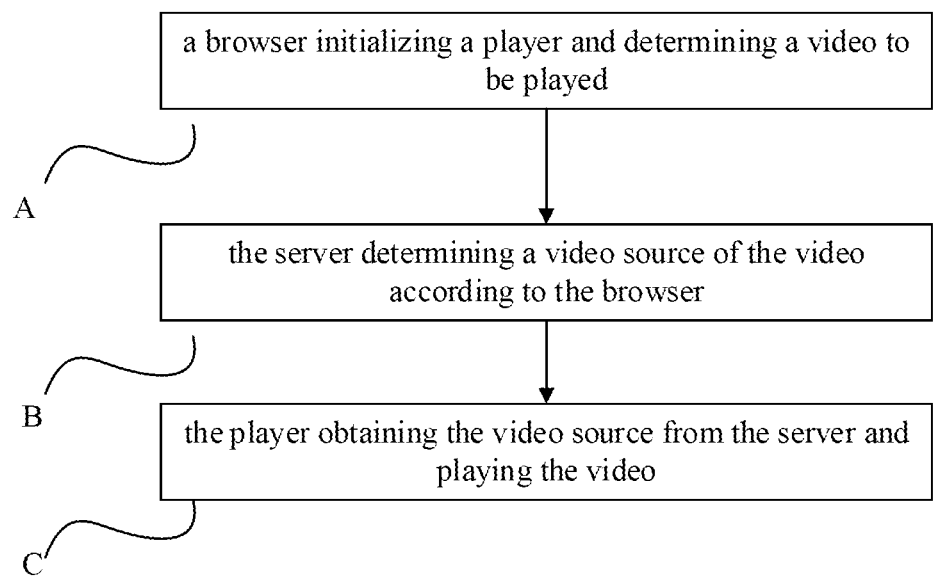
FIG. 2 illustrates a flowchart of steps of another embodiment of the video playing control method based on a video source selection of the present invention.

The present invention also provides a video playing control method based on a video source selection, in an embodiment, the method is shown in FIG. 2, includes the following steps:

(A) a browser initializing a player and determining a video to be played;

(B) the server determining a video source of the video according to the browser, the video source includes a DASH format, an fly format and an mp4 format;

(C) the player obtaining the video source from the server and playing the video.

In one preferred embodiment, the step (B) specifically includes the following steps:

the server determining a video source from the DASH format, the fly format and mp4 format according to a support degree of the browser for each video source format. specifically, the step specifically includes: the server includes an online learning library, the online learning library stores the support degree of the browser for each video source format, the step (B) specifically includes the following steps: determining the video source from the DASH format, the fly format and the mp4 format, according to the support degree of the video source format stored in the online learning library.

In a further preferred embodiment, the server obtains the support degree of each browser for each video source format to establish and update the online learning library, by analyzing the logs of each video source video played on each browser.

In a more preferred embodiment, the method further includes the following steps:

(D) when an error occurs in the player, preferring a previous video source in the order of the DASH format, the fly format and the mp4 format.

The present invention also provides a video playing control device based on a video source selection and a computer-readable storage medium, the device includes a processor and a memory, the memory is the computer-readable storage medium, storing computer programs. When the computer programs are executed by the processor, the video playing control method based on a video source selection is realized.

Figure 3:
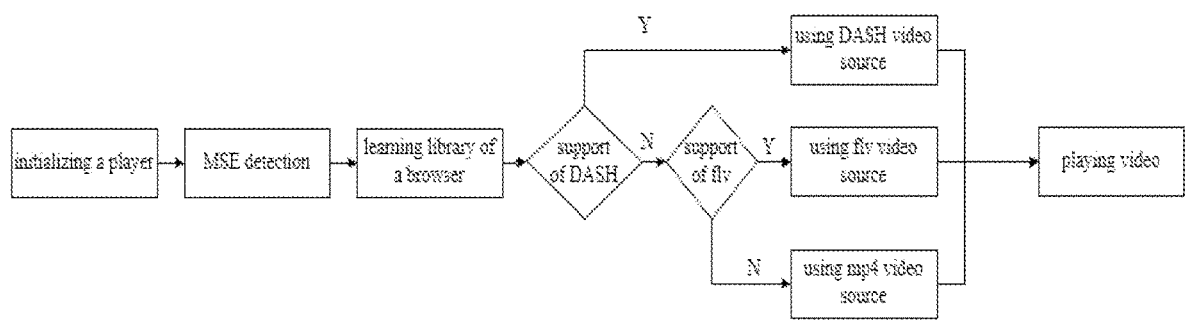
FIG. 3 illustrates a flowchart of video playing control method based on a video source selection of the present invention in an actual application.

In an actual application, the flowchart of the video playing control device based on a video source selection of the present invention is shown in FIG. 3, the specific implementation is described by the following embodiments.

Embodiment 1

Different browsers choose different video source types by default. An available video source format of a browser is determined by an MSE detection (determining whether the browser has an API related to MSE).

Specifically to say, first, a browser initializes a player and determines a video to be played; determines a video source of the video according to a type of the browser, the video source includes a DASH format, an fly format and an mp4 format; a server includes an online learning library, which stores a support degree of the browser for each video source format. A summary of browser adaptation feature library can be analyzed on a regular basis according to player logs, such as analyzing the play logs once a week, filtering out a list of browsers that do not perform well within the scope of the support degree, and playing them with another video source, such as Ie11 browser of Windows 7 platform, although the browser has an API that support the MSE, but an error rate is high, so it will exclude DASH and fly playback and play with mp4. According to the support degree of the video source format stored in the online learning library, a video source can be determined in the DASH format, the fly format and the mp4 format. A selection process is as shown in FIG. 3. The player then uses the selected video source to play the video.

Embodiment 2

Difference from the embodiment 1, the online learning library (Official Learning Library) is a determination based on big data. However, because of the different performances of personal network environments and device environments, support lists of the browser of the online learning library is not always optimal for individuals, so an individual can also have a local browser device list (Local Learning Library) to record a browser usage and the error rate, the number of browsers used by an individual is not large, so it is enough to use for an individual. For example, a user who uses Chrome/70 version of browser supports videos of various playback formats, but for fly CDN, a speed for establishment is slow and a failure rate for the establishment is high. Therefore, in case of errors in the DASH format, the video of mp4 is retried first.

Therefore, in the case of using the local learning library, the browser determines a video source in the DASH format, fly format and mp4 format according to the support degree of the video source format stored in the local learning library.

Embodiment 3

Figure 4:
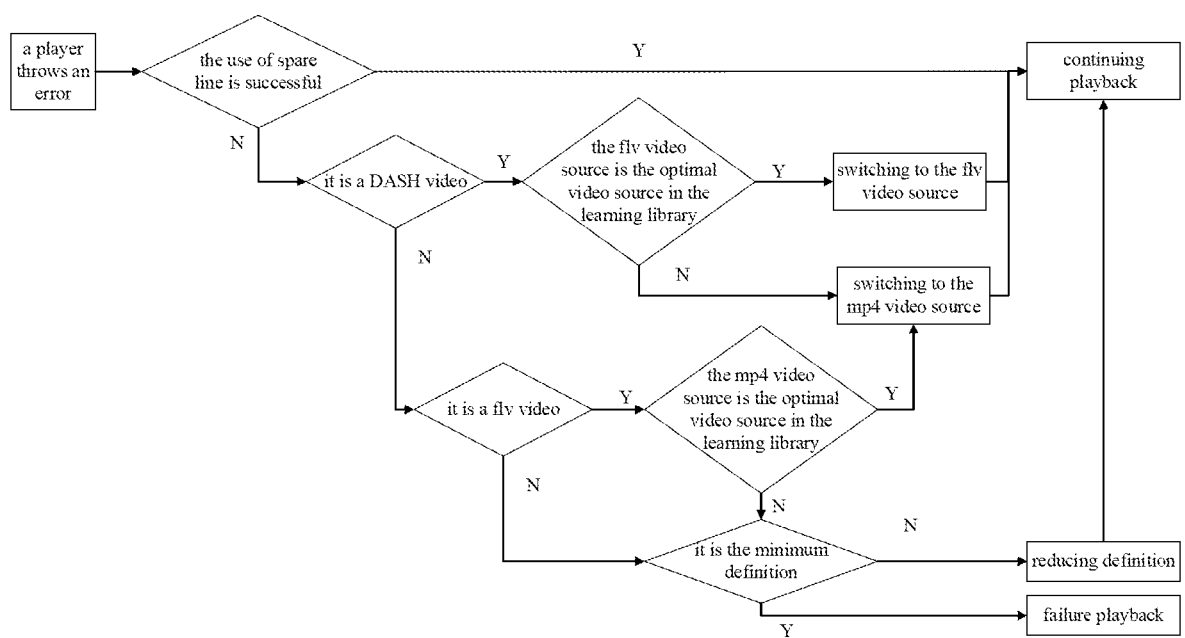
FIG. 4 illustrates a schematic diagram of a fallback flow when a playback error occurs in the actual application of the video playing control method based on the video source selection of the present invention.

When an error occurs during playback, you can also use fallback to degrade the source of other formats to solve the problem. Generally speaking, the fallback degradation process is as shown in FIG. 4, which ensures the video can continues to play smoothly by a way of retrying the spare line, reducing the source, learning library determination, and reducing the definition in order. The order of source reduction is in order of the DASH format, the fly format and the mp4 format.

The video playing control method, device and computer-readable storage medium based on a video source selection are adopted, which can determine a video source format adopted according to the browser, and then filter the video source according to actual application effect of a player, adopt the optimal video source, and automatically select other video sources to continue playing in case of playing errors. And, the video playing control method, device and computer-readable storage medium based on a video source selection of the present invention have the advantages of simple implementation mode, low application cost and wide application range.

In this specification, the present invention has been described with reference to its specific embodiments. However, it is clear that various modifications and changes can still be made without departing from the spirit and scope of the present invention. Therefore, the specification and drawings shall be considered as illustrative rather than restrictive.

What is claimed is:

1. A method of controlling video playing based on a video source selection, comprising:
   initializing a player by a browser among a plurality of browsers;
   determining a video to be played;
   determining a video source format of the video based on the browser, wherein the determining a video source format of the video based on the browser further comprises determining the video source format among a plurality of video source formats based on information indicative of a support degree of the browser supporting each of the plurality of video source formats;
   obtaining the video in the determined video source format; and
   playing the video by the player;
   wherein the method further comprises:
   generating and updating a learning library based on analyzing data indicative of performance of playing videos in each video source format by each of the plurality of browsers, wherein the learning library stores information indicative of a support degree of each browser supporting each video source format among the plurality of video source formats.

2. The method of claim 1, wherein the plurality of video source formats comprise a Dynamic Adaptive Streaming over HTTP (DASH) format, an Flash Video (fly) format, and an MPEG-4 (mp4) format.

3. The method of claim 1, wherein a learning library stores the information indicative of the support degree of the browser supporting each of the plurality of video source formats, and wherein the determining a video source format of the video based on the browser further comprises determining the video source format among the plurality of video source formats based on the information stored in the learning library.

4. The method of claim 1, further comprising:
   in response to determining that there is a same support degree for each of the plurality of video source formats, selecting the video source format based on a predetermined priority order of the plurality of video source formats.

5. The method of claim 1, further comprising:
   in response to determining that an error occurs in the player, selecting another video source format among the plurality of video source formats based on a predetermined priority order of the plurality of video source formats.

6. A non-transitory computer-readable storage medium, storing computer programs, when the computer programs are executed by a processor, the computer programs cause the processor to perform operations comprising:
   determining a video to be played;
   initializing a player by a browser among a plurality of browsers;
   determining a video source format of the video based on the browser, wherein the determining a video source format of the video based on the browser further comprises determining the video source format among a plurality of video source formats based on information indicative of a support degree of the browser supporting each of the plurality of video source formats;

obtaining the video in the determined video source format; and playing the video by the player;

wherein the operations further comprise:

generating and updating a learning library based on analyzing data indicative of performance of playing videos in each video source format by each of the plurality of browsers, wherein the learning library stores information indicative of a support degree of each browser supporting each video source format among the plurality of video source formats.

7. The non-transitory computer-readable storage medium of claim 6, the operations further comprising:

determining the video source format among the plurality of video source formats based on the information stored in the learning library.

8. The non-transitory computer-readable storage medium of claim 6, wherein the plurality of video source formats comprise a Dynamic Adaptive Streaming over HTTP (DASH) format, a Flash Video (flv) format, and an MPEG-4 (mp4) format.

9. The non-transitory computer-readable storage medium of claim 6, the operations further comprising:

in response to determining that there is a same support degree for each of the plurality of video source formats, selecting the video source format based on a predetermined priority order of the plurality of video source formats.

10. The non-transitory computer-readable storage medium of claim 6, the operations further comprising:

in response to determining that an error occurs in the player, selecting another video source format among the plurality of video source formats based on a predetermined priority order of the plurality of video source formats.

11. A device of controlling video playing based on a video source selection, which includes a processor and a memory, wherein the memory stores computer programs, when the computer programs are executed by the processor, the computer programs cause the processor to perform operations comprising:

determining a video to be played;

initializing a player by a browser among a plurality of browsers;

determining a video source format of the video based on the browser, wherein the determining a video source format of the video based on the browser further comprises determining the video source format among a plurality of video source formats based on information indicative of a support degree of the browser supporting each of the plurality of video source formats;

obtaining the video in the determined video source format; and playing the video by the player;

wherein the operations further comprise:

generating and updating a learning library based on analyzing data indicative of performance of playing videos in each video source format by each of the plurality of browsers, wherein the learning library stores information indicative of a support degree of each browser supporting each video source format among the plurality of video source formats.

12. The device of claim 11, the operations further comprising:

determining the video source format among the plurality of video source formats based on the information stored in the learning library.

13. The device of claim 11, wherein the plurality of video source formats comprise a Dynamic Adaptive Streaming over HTTP (DASH) format, a Flash Video (flv) format, and an MPEG-4 (mp4) format.

14. The device of claim 11, the operations further comprising:

in response to determining that there is a same support degree for each of the plurality of video source formats, selecting the video source format based on a predetermined priority order of the plurality of video source formats.

15. The device of claim 11, the operations further comprising:

in response to determining that an error occurs in the player, selecting another video source format among the plurality of video source formats based on a predetermined priority order of the plurality of video source formats.

* * * * *